United States Patent [19]
Lohneis et al.

[11] 3,817,391
[45] June 18, 1974

[54] TOOL STORAGE MAGAZINE

[75] Inventors: Earl R. Lohneis; Frank Zankl, both of Milwaukee, Wis.

[73] Assignee: Kearney & Frecker Corporation, West Allis, Wis.

[22] Filed: May 22, 1972

[21] Appl. No.: 255,409

[52] U.S. Cl.................... 211/1.5, 29/568, 211/69
[51] Int. Cl................... A47f 3/08, A47f 7/00
[58] Field of Search........... 211/1.5, 122, 121, 60 T, 211/69; 29/568, 26 A

[56] References Cited
UNITED STATES PATENTS

| | | | |
|---|---|---|---|
| 3,073,024 | 1/1963 | Hutchens et al. | 29/568 |
| 3,286,344 | 11/1966 | Brainard et al. | 29/568 |
| 3,389,804 | 6/1968 | Lyon | 211/1.5 |
| 3,414,967 | 12/1968 | Erikson | 29/568 |
| 3,431,634 | 3/1969 | Balding | 29/568 |
| 3,577,617 | 5/1971 | Herle | 29/26 A X |

*Primary Examiner*—Ramon S. Britts
*Attorney, Agent, or Firm*—Cyril M. Hajewski

[57] ABSTRACT

A tool storage magazine for storing a plurality of tools that are adapted to be used in the work station of a machine tool. The magazine includes a chain driven in an established path of travel by a suitable source of power. A plurality of cartridges are coupled to the chain for movement with it in the same path of travel. Each of the cartridges is provided with a suitable opening forming a socket for receiving the shank of a tool so that each of the cartridges in the magazine may carry a tool. A tool change station is provided in the magazine wherein the cartridges may be removed as well as returned to the magazine for storage. The cartridges are coupled to the chain in such a manner that they may be uncoupled by simply moving the cartridge away from the chain at the tool change station. Moreover, the spacing of the cartridges along the chain can be varied to accommodate different size tools to be stored. For example, if certain types of tools require more room on each side because of their configuration, the cartridges may be spaced along the chain accordingly, in the most efficient manner, to conserve the capacity of the magazine to carry tools.

14 Claims, 11 Drawing Figures

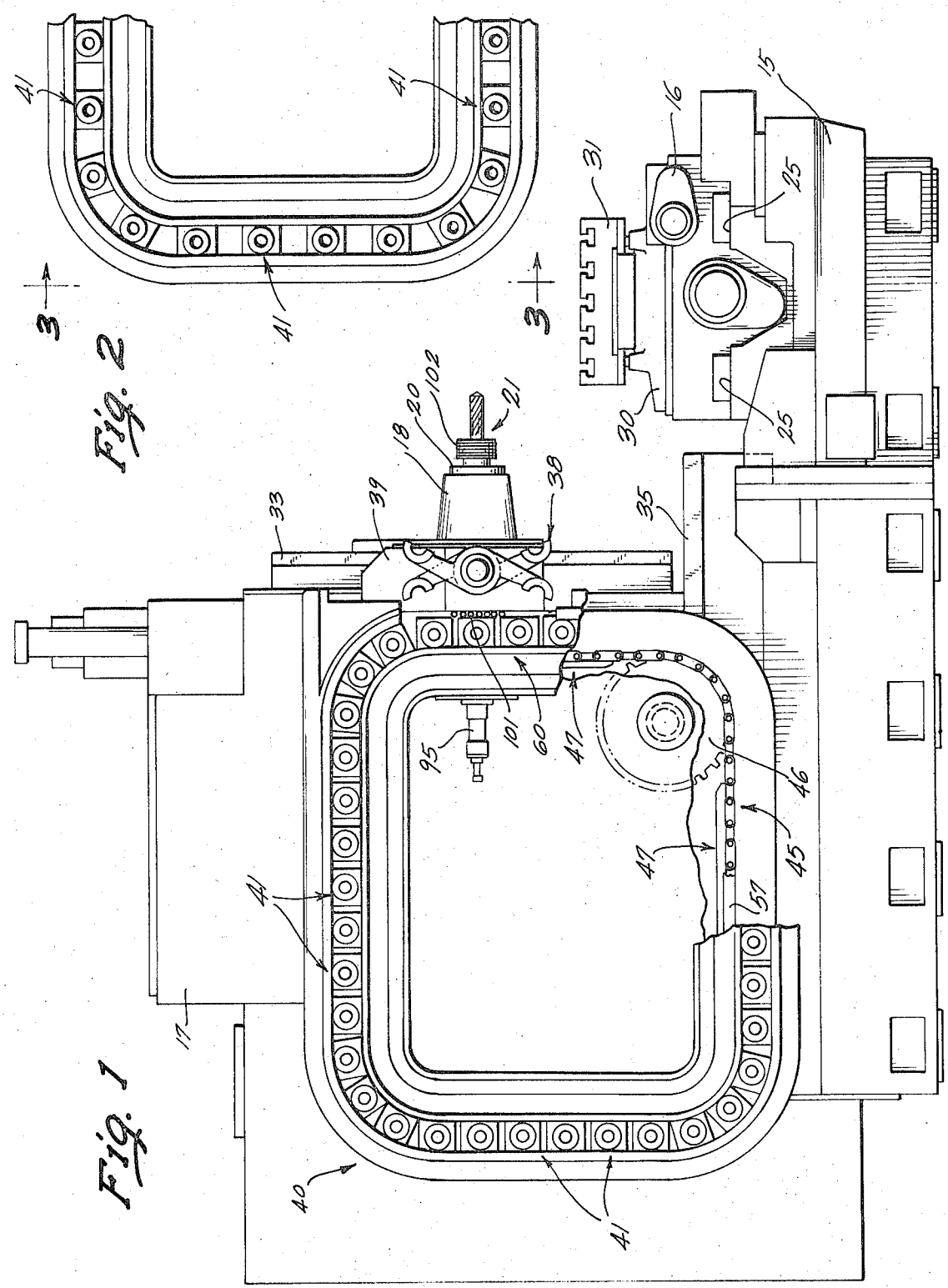

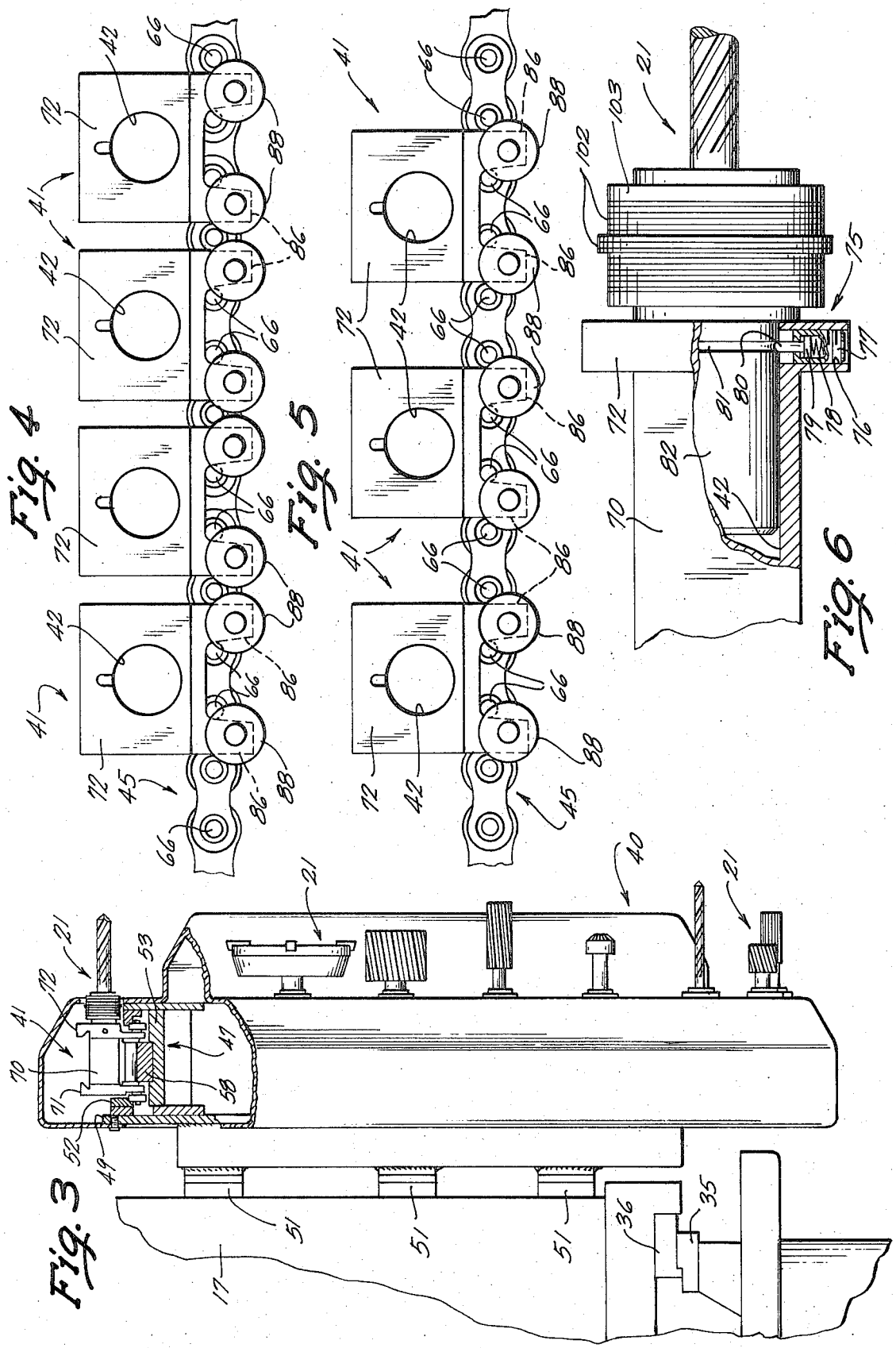

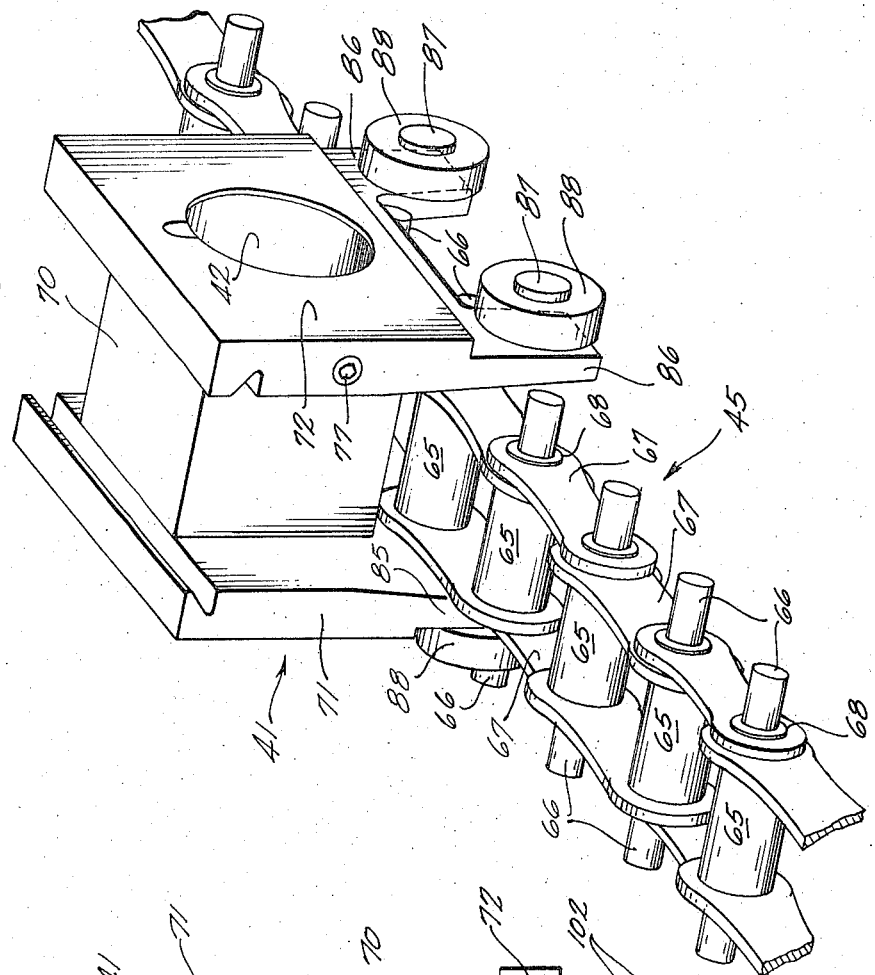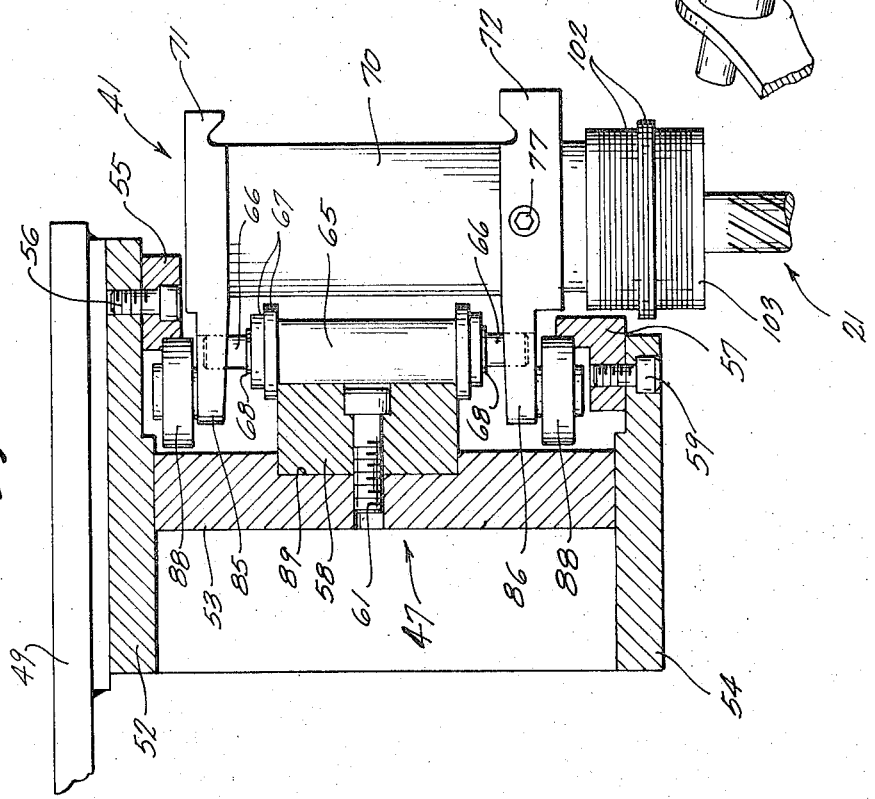

TOOL STORAGE MAGAZINE

BACKGROUND OF THE INVENTION

Automatic machine tools may be equipped with a tool change mechanism that includes a tool storage magazine which stores a plurality of tools for use at the work station of the machine. A suitable transfer member is provided for transferring the tools between the tool storage magazine and the work station. The tool storage magazine is provided with a plurality of sockets or tool carriers for receiving the tools, but the spacing of the sockets is fixed in the magazine. When larger tools are used which require more space between them, it is necessary to either interrupt the automatic operation of the machine and insert such tools manually into the work station, or use alternate sockets for carrying the tools so that sockets on each side of the tool remain empty to provide the additional room for the larger size tool.

It usually occurs that, although the tools are too large for the normal spacing of the sockets, they do not require all of the additional space that is provided by leaving the sockets empty on each side. As a result, an appreciable amount of space is wasted and the capacity of the tool storage magazine to carry tools is reduced excessively so that such system is very inefficient.

Moreover, in the tool storage magazines presently available, the sockets themselves are an integral part of the machine so that they are not readily removable. More importantly, they are not removable during the tool change cycle to facilitate such operation in the manner described in co-pending patent application.

It is therefore a general object of the present invention to provide an improved tool storage magazine having a plurality of tool carriers for supporting tools in the magazine which can be spaced different distances apart to accommodate different size tools, with such spacing being done most efficiently so that the storage capacity of the machine is reduced only enough to accommodate the larger tools without wasting space.

A further object is to provide an improved tool storage magazine having a plurality of tool carriers movable in an established path of travel by a power drive and which can be readily uncoupled from the power drive and removed from the magazine by simply moving the carrier away from the magazine.

Another object is to provide an improved tool storage magazine having a plurality of tool carriers for supporting tools in the magazine that can be readily removed from the magazine during a tool change cycle to facilitate the tool change operation.

SUMMARY OF THE INVENTION

According to this invention, the improved tool storage magazine comprises a continuous chain guided for movement in a specific path of travel and driven in such path of travel by a suitable source of power. A plurality of tool carriers or cartridges are coupled to the chain for movement therewith so that the cartridges move in a corresponding path of travel. Each carrier is provided with a socket for receiving the shank of a tool so that each cartridge carries a tool to be used at the work station of the machine tool.

The coupling of the cartridges to the chain is accomplished by a plurality of legs extending from the cartridges to engage pins which are a part of the chain. The cartridges can be uncoupled from the chain by simply sliding the cartridge with its integral legs off of the pins. However, a retainer is provided on the magazine, in engagement with the cartridges, to prevent movement of the cartridges in a direction which would allow the legs to lift off of the pins. The chain drives the cartridges sequentially into a tool change station and the retainer is interrupted at the tool change station to permit the cartridge located there to be uncoupled from the chain and removed from the magazine, or to be returned to the magazine and coupled to the chain for movement in the magazine.

The pins on the chain to which the cartridges are coupled are spaced so that the cartridges can be engaged with different sets of pins to vary their spacing in the magazine relative to each other for the purpose of accommodating different size tools. Thus, the cartridges and their tool receiving sockets can be spaced in the magazine a greater distance than the minimum spacing but a lesser amount than the distance between alternate sockets. Accordingly, larger size tools can be accommodated by the magazine without sacrificing any more tool capacity than is necessary.

BRIEF DESCRIPTION OF THE DRAWINGS

FIG. 1 is a view in side elevation illustrating a machine tool equipped with a tool change mechanism that incorporates the improved tool storage magazine of the present invention;

FIG. 2 is a fragmentary view showing a portion of the tool storage magazine depicted on the machine in FIG. 1, but showing a different spacing for the tool carriers in the magazine;

FIG. 3 is a detail view in rear elevation showing the improved tool storage magazine of the present invention and its mounting on the machine tool, a portion of the magazine being broken away to reveal the mounting of a tool carrier on the chain;

FIG. 4 is a diagrammatic view illustrating the coupling of the tool cartridges to the drive chain with the cartridges being shown spaced the minimum possible distance from each other;

FIG. 5 is a diagrammatic view similar to the view in FIG. 4 except that the tool cartridges are shown coupled to the chain farther apart to accommodate larger tools;

FIG. 6 is a detail view partly in section and partly in elevation showing the detent mechanism for yieldably retaining the tools in the cartridges;

FIG. 7 is a detail perspective view depicting one of the tool cartridges coupled to the drive chain;

FIG. 8 is a detail view partly in plan and partly in horizontal section showing a tool cartridge disposed in the magazine at a position other than at the tool change station;

DESCRIPTION OF THE PREFERRED EMBODIMENT

Figure 11:
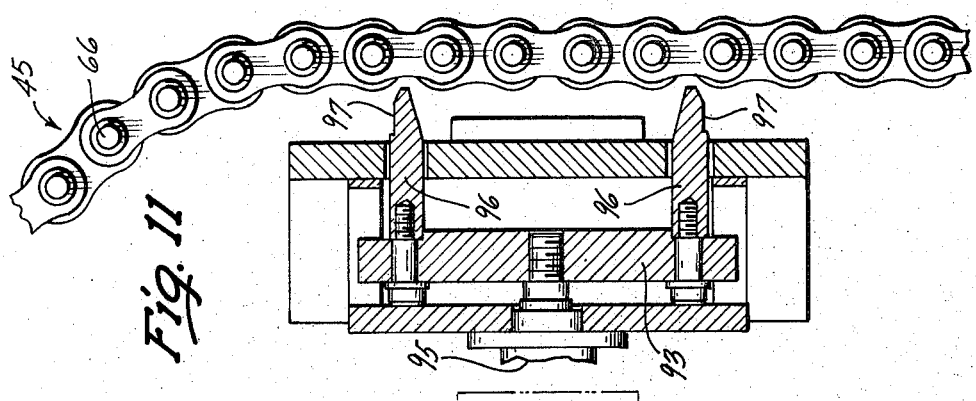
FIG. 11 is a fragmentary view similar to the view in FIG. 10 except that the clamping mechanism is shown in its released condition to free the chain for movement about the magazine.

Reference is now made more particularly to the drawings and specifically to FIG. 1 thereof which illustrates an automatic machining center having a tool change mechanism which incorporates the improved tool storage magazine of the present invention. As there shown, the machine itself comprises a bed 15 which carries a work supporting table 16 at its forward end and an upright 17 at its rearward position. The upright 17 operably supports a spindle head 18 in which a spindle 20 is journalled, the spindle being adapted to receive tools 21 for performing a work operation. The tools used in the illustrated machine are mounted in a standard toolholder which is adapted for reception in the spindle 20. In this description, the combination of the toolholder and its associated cutter will be referred to generally as a tool and will be identified by the reference numeral 21.

The table 16 is carried by the bed 15 for movement in a horizontal path of travel which is normal to the axis of the spindle 20. This path of travel of the table 16 is commonly referred to in the art as the "X" axis of movement. To this end, the table 16 is carried on a pair of ways 25 that are mounted on the top surface of the bed 15 for sliding engagement with the bottom of the table 16. A rotary table 30 is supported by the table 16 and is adapted to receive a pallet 31 on which the workpiece (not shown) to be operated upon is mounted.

The spindle head 18 is movable in a vertical path of travel transverse to the path of travel of the table 16 along a path generally referred to in the art as the "Y" axis of movement. To this end, the upright 17 is provided with a pair of vertical ways 33 which are slidably engaged by cooperating ways (not shown) on the spindle head 18. The upright 17 is provided with a central opening for receiving the spindle head 18 with a way 33 being disposed on each side of the spindle head.

The upright 17 is movable in a horizontal path of travel normal to the path of travel of the table 16 and which is commonly referred to in the art as the "Z" axis of travel. Accordingly, the rearward portion of the bed 15 represents a pair of ways 35 disposed for sliding engagement with cooperating ways 36 formed on the underside of the upright 17, as shown in FIG. 3. With this arrangement, the upright 17 is adapted to move a tool 21 toward and away from a workpiece mounted on the rotary table 30.

Suitable power drive mechanisms (not shown) are provided for actuating the table 16, spindle head 18, and upright 17 in their respective paths of travel along the X, Y and Z axes. In addition, a power drive means (not shown) is provided for rotating the rotary table 30 with the pallet 31 mounted thereon to present a workpiece to the tool 21. All of these movements are preferably under the control of a numerical control circuit for automatic operation of the machine tool.

The tool change mechanism illustrated in the present embodiment includes a tool change arm generally identified by the reference numeral 38 which is mounted on a carrier 39, and a tool storage magazine generally identified by the reference numeral 40. The tool change arm 38 and carrier 39 cooperate to form a tool transfer mechanism for transferring tools between the tool storage magazine 40 and the spindle 20. The tool storage magazine 40 incorporates the features of the present invention and may be utilized with different types of tool transfer mechanisms, the tool change arm 38 and carrier 39 being illustrated in the present description as an operable embodiment.

The tools 21 are carried in the storage magazine 40 in separate tool carriers or cartridges generally identified by the reference numeral 41, and each cartridge 41 is provided with a bore to form a socket 42 for receiving the shank of one tool 21. The cartridges 41 are moved in the magazine 40 by a continuous chain generally identified by the reference numeral 45 which is actuated in its path of travel by a sprocket 46 that is driven by a suitable source of power (not shown).

The tool storage magazine 40 is illustrated in the present application as being of rectangular configuration although it is to be understood that other configurations, such as circular, may be provided if desired. Moreover, the construction of the tool storage magazine 40 is such that it can readily be varied in size to suit the requirements of a particular situation. The path of travel of the chain 45 corresponds to the rectangular configuration of the tool storage magazine 40 and is established by a chain guide 47 which extends about the entire rectangular path of travel of the chain 45, including the rounded corners, with the exception of the lower right hand corner, as viewed in FIG. 1, where clearance is provided for the drive sprocket 46 and the chain is guided about this corner by the sprocket itself.

As best shown in FIG. 3, the chain guide 47 is carried by a back plate 49 which supports the entire tool storage magazine 40. The back plate 49 is mounted on the side of the upright 17, being spaced therefrom by suitable spacers 51.

The chain guide 47, as best shown in FIG. 8, comprises a rear support 52 mounted on the plate 49 and having a laterally extending web 53. A forward support 54 is secured to the outer end of the web 47 so that the rear support 52, the web 53, and the forward support 54 form an H-shape in cross section. A retainer element 55 is secured to the rear support 52 by screws 56 and a similar retainer element 57 is secured to the forward support 54 by screws 58. The retainer elements 55 and 57 serve to retain the cartridges 41 in the magazine 40 and in driving engagement with the chain 45 but are interrupted at a tool change station 60 to enable the cartridges 41 to be removed from the magazine and returned thereto at this station. A guide rail 58 is centrally located between the rear support 52 and the forward support 54, being secured to the web 53 by screws 59.

The construction of the chain 45 is best illustrated in FIG. 7 and comprises a plurality of rollers 65 of cylindrical configuration having pins 66 extending axially from each end. The pins 66 are of substantially less diameter than the rollers 65 so that a shoulder is formed at the juncture of the pins with the rollers 65. Each pair of adjacent rollers 65 is connected together by a chain link 67 which bears against such shoulder and is retained against the shoulder by a snap ring 68 that embraces the pins 66 and bears against the surface of the outer links 67. As shown, the links 67 are disposed on both sides of the rollers 65 and the pins 66 extend outwardly of the links 67.

The cartridges 41 are identical in construction and, as clearly shown in FIG. 7, comprise a central body portion 70 having a slide member 71 on one side and a similar side member 72 on the opposite side. The bore forming the socket 42 for receiving the shank of the tools 21 extends through the side member 72 and into the body 70, being of sufficient length to receive the entire shank.

The tools 21 are yieldably retained in the socket 42 by a detent mechanism generally identified by the reference numeral 75 and depicted in FIG. 6. The detent mechanism 75 is mounted in the cartridge side member 72 having a threaded bore 76 for receiving a threaded plug 77. A spring 78 is disposed within the bore 76 with one end bearing against the plug 77 and the other end bearing against a disc 79 which is movable within the bore 76. A peg 80 extends axially from the disc 79 to protrude from the bore 76 for engagement with an annular groove 81 formed in a shank 82 of the tools 21. When the tool 21 is fully inserted into the socket 42, the groove 81 will be in alignment with the peg 80 of the detent mechanism 75. The spring 78 urges the peg 80 into the groove 81 to retain the tool 21 in position. However, as the tool 21 is extracted from the socket 42, the spring 78 will yield to permit its withdrawal.

The side member 71 of the cartridge 41 is provided with a pair of extending legs 85 which are in spaced relationship, with both legs 85 extending from the same edge of the side member 71 but on opposite sides. In like manner, the side member 72 is provided with similar legs 86 that also extend from the same edge of the side member 72 but are located on opposite sides of the member to place them in spaced relationship. The legs 86 on the side member 72 are spaced identically to the spacing of the legs 85 on the side member 71 and are in alignment with them. A shaft 87 extends laterally and outwardly from each of the legs 85 and 86 and a roller 88 is journalled on each of the shafts 87. Accordingly, each of the legs 86 carries one of the rollers 88.

The rollers 88 serve to render the cartridges 41 mobile with the operation of the chain 45. To this end, the rollers 88, which are carried by the side member 71, are in engagement with the retainer element 55, as clearly shown in FIG. 8, and the rollers 88, which are carried by the side member 72, are in engagement with the retainer element 57. The retainer elements serve to retain the rollers in position and the rollers move along these retainer elements. Thus, the retainer elements 55 and 57 engage the rollers 88 on the side members 71 and 72, respectively, to retain the entire cartridge in the tool storage magazine. As previously mentioned, the retainer elements 55 and 57 are interrupted at the tool change station 60 to release the rollers 88 so that the cartridges 41 may be withdrawn from the tool storage magazine or returned to it at this station.

The continuous chain 45 is guided in its path of travel by the guide rail 58, as depicted in FIG. 8. To this end, the rollers 65 of the chain 45 are all in engagement with an outer surface 89 of the guide rail 58 and the links 67 are disposed to engage the edges of the guide rail 58. As a result, the rollers 65 roll along the surface 89 of the guide rail 58 and the links 67 engage its edges to prevent lateral displacement of the chain 45.

The cartridges 41 are coupled to the chain 45 by the engagement of the legs 85 and 86 with the pins 66 which extend outwardly of the linkgs 67. The legs 86 straddle a pair of pins 66 on one side of the chain 45 while the legs 85 straddle the associated pins 66 that extend from the opposite ends of the same two rollers on the opposite side of the chain 45. The legs 85 and 86 slide onto the pins 66 and are retained in engagement therewith by the operation of the retainer elements 55 and 57 which prevent the outward movement of the rollers 88, and therefore, prevent the outward movement of the entire cartridge 41.

The engagement of the legs 85 and 86 with the pins 66 is illustrated diagrammatically in FIGS. 4 and 5. It will be noted that the legs 86 are tapered so that they are narrower at the bottom, as viewed in FIGS. 4 and 5, and reach a maximum width at their juncture with the side member 72. The legs 85 of the side member 71 are of the same construction as the legs 86 of the side member 72. As a result of this tapered construction, the spacing between the two legs 86 of each side member 72 is wider at the bottom than it is at the top so that the legs can readily slide over an adjacent pair of pins 66. The spacing of the legs 86 at their top where they join a side member 72 conforms to the outside dimension from the periphery of one pin 66 to the periphery of the adjacent pin 66 and the inside corners where the legs 86 join the side member 72 are each provided with a radius which conforms to the radius of the pins 66. Therefore, the pins 66 have tight engagement with the legs 86 and yet the cartridges may be removed from such engagement merely by withdrawing them away from the chain 45. Conversely, the cartridges 41 may be coupled to the chain 45 by simply sliding the legs 85 and 86 over adjacent pairs of pins 66. The description has referred primarily to the legs 86 on the side member 72, but it should be understood that an identical arrangement is provided on the opposite side of the cartridge 41 for coupling the side member 71 and its two legs 85 to the pins 66.

One of the outstanding features of the present invention lies in the fact that the spacing of the cartridges 41, and therefore, of the sockets 42 along the chain 45 can be varied to meet the particular requirements. In the prior art tool storage magazines, the spacing of the toolholders is fixed, and when such spacing is not sufficient to accommodate larger diameter tools, the sockets on each side of such larger tools are left vacant so that only alternate sockets are employed. This, of course, reduces the capacity of the tool storage magazine substantially. In the tool storage magazine of the present invention, instead of leaving alternate sockets vacant, the cartridges 41 can be spaced differently on the chain 45 to accommodate the larger diameter cutters and all of the sockets 42 may be utilized for storing tools. Moreover, the spacing of the sockets 42 need not be doubled, as is done when using alternate sockets in the prior art tool storage magazines, but instead, the cartridges 41 and their associated sockets 42 may be spaced just sufficiently to accommodate the larger sized tools so that even if all of the cartridges 41 are thus spaced, the capacity of the tool storage magazine will not be halved.

This feature of the invention is best illustrated in FIGS. 4 and 5 where different spacings of the cartridges 41 along the chain 45 are illustrated. In FIG. 4, the cartridges 41 are shown coupled to the chain 45 with the smallest available spacing between cartridges. It will be noted, that only one pin 66 remains vacant between adjacent cartridges 41. In FIG. 5, the spacing of the cartridges 41 has been increased by leaving two pins 66 vacant between cartridges 41 so that the spacing of the cartridges 41 has been increased by the pitch of the chain. This increased spacing has not reduced the capacity of the tool storage magazine in half, as is obvious by comparing the location of the cartridge 41 in FIGS. 4 and 5. Thus, in FIG. 5, three cartridges with the increased spacing are coupled to the chain 45 along a length which is less than the length required for the four cartridges 41 spaced as illustrated in FIG. 4. If greater spacing is required, three pins 66 may be left vacant between the cartridges 41 and the spacing of the cartridges 41 will then be increased by twice the pitch of the chain. Such spacing will accommodate even larger cutters, and if all of the cartridges 41 are thus spaced along the chain 45, the capacity of the tool storage magazine for tools will still not be reduced to one-half of that shown in FIG. 4. It is therefore apparant that the improved tool storage magazine of the present invention has great flexibility to meet the requirements of a particular situation.

The variable spacing of the cartridges 41 in the magazine is also illustrated in FIGS. 1 and 2. In FIG. 1, the cartridges 41 are shown in their minimum spacing according to the spacing depicted in FIG. 4. The illustration in FIG. 2 shows these same cartridges 41 in the magazine 40 but with their spacing relative to each other having been increased in accordance with the spacing shown in FIG. 5.

The drawing shows the cartridges 41 equally spaced but this need not be. The cartridges 41 can be loaded into the magazine with their cartridges spaced differently from each other so that large and small diameter cutters can be stored simultaneously without wasting the tool storage capacity of the magazine. For example, the tools required for a machining operation may include only one large size cutter. Accordingly, the cartridge 41 containing the large size cutter would be spaced a greater distance from its two adjacent cartridges than the other cartridges would be spaced from each other so that the small size cutters would not occupy as much space in the magazine as the large size cutter. The tool storage capacity of the machine would therefore be reduced only by the amount necessary to accommodate the one large size cutter.

The number of cartridges in the magazine can be varied as desired within the capacity of the magazine without adversely affecting its operation. As a matter of fact, if desired, only one cartridge 41 could be placed in the magazine and it would continue to function satisfactorily. Thus, it is apparent that the improved tool storage magazine of the present invention has great versatility to accommodate a variety of situations.

Figure 10:
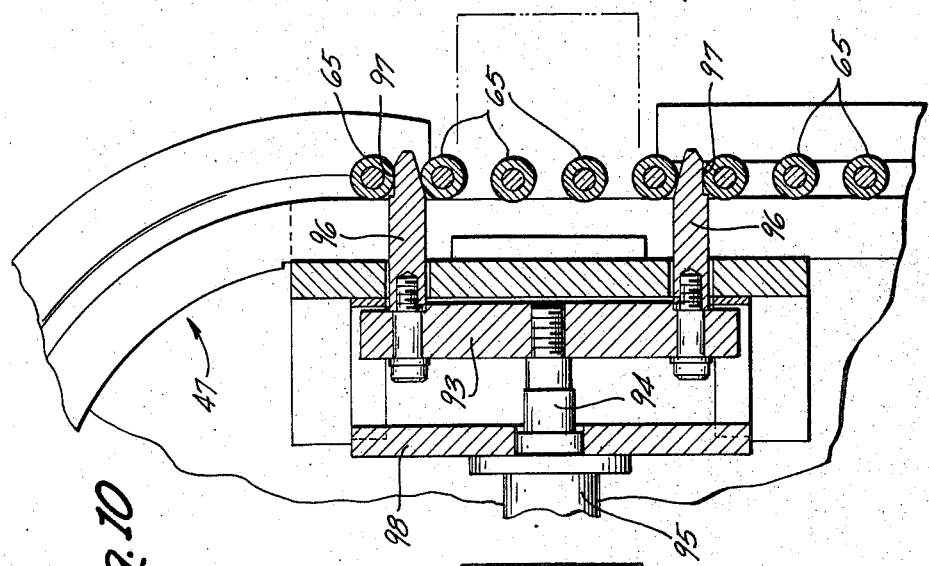
FIG. 10 is a fragmentary view partly in side elevation and partly in vertical section showing the chain clamping mechanism in its operating condition for clamping the chain in its stopped position.

The desired tools for placement in the spindle 20 are located at the tool change station 60 so that they may be extracted from the magazine and transferred to the spindle 20 by the carrier 39 and the tool change arm 38. For completely automatic operation in this manner, the tool at the tool change station 60 must be accurately aligned, and the chain 45 must be rendered immovable. To this end, a clamping mechanism illustrated in FIGS. 10 and 11 is provided. The clamping mechanism there shown comprises a crossbar 93 which is secured to a piston rod 94 of a piston and cylinder mechanism 95 that is mounted on a plate 98 secured to the frame of the magazine. Two parallel prongs 96 extend laterally from the crossbar 93 in spaced relationship and serve as clamping members for accurately aligning and clamping the chain 45 after its movement has been terminated. To this end, each prong 96 is provided with a rectilinear surface 97 for engagement with the periphery of a roller 65 of the chain 45. When the chain is actuated in its path of travel for moving the cartridges 41 and their associated tools 21, the piston rod 94 is retracted to thereby retract the prongs 96 into the position shown in FIG. 11 wherein they are out of engagement with the rollers 65 of the chain 45.

When a desired tool arrives at the tool chain station 60, the actuation of the chain 45 is terminated but such stopping of the chain 45 does not assure accurate alignment of the desired tool at the tool change station 60. Any misalignment of the desired tool at the tool change station 60 is obviated by operation of the chain clamping mechanism. Thus, when the chain has stopped, the piston and cylinder mechanism 95 is energized to extend the piston rod 94 and move the prongs 96 to the clamping position illustrated in FIG. 10. With the clamping mechanism thus actuated, the rectilinear surfaces 97 of the two prongs 96 will move into engagement with the peripheries of separate rollers 65. The spacing between the two rectilinear surfaces 97 is such that tight engagement will be obtained with the rollers 65 so that they will be accurately positioned to thereby accurately align the desired tool at the tool change station 60. If the chain should be inaccurately stopped, the moving prongs 96 will shift the chain to correct the inaccuracy and effect accurate alignment.

As previously mentioned, the retainer elements 55 and 57 retain the cartridges 41 in the tool storage magazine 40 but these retainer elements are interrupted at the tool change station 60 so that the cartridges 41 may be removed at this station or placed in the magazine at this station. However, some removable retainer means must be provided at the tool change station 60 to retain the cartridges 41 in the tool storage magazine and in coupled engagement with the chain 45 so that the cartridges can pass through the tool change station 60 as needed. This function is performed in the illustrated embodiment by the carrier 39 which is pivotable to the retaining position illustrated in FIG. 1 and is provided with rollers 101 that engage the surfaces of the cartridges 41 as they pass through the tool change station 60 so that the carrier 39 retains the cartridges 41 in position in the tool storage magazine 40 without interfering with their movements. The carrier 39 can be pivoted toward the spindle 20 to release the cartridges 41 at the tool change station for manual loading and unloading purposes. Other types of retention, of course, can be employed for this purpose.

The particular tool transfer mechanism, including the carrier 39, shown in the drawings, functions to remove the cartridge 41 at the tool change station 60 for the tool interchange operation. In this particular embodiment, a tool change cycle includes the clamping of the cartridge 41 at the tool change station 60 to the carrier 39. The carrier 39 is then pivoted toward the spindle 20 taking the clamped cartridge 41 with it, and since the tool change arm 38 is operably carried by the carrier 39, it moves with it toward the spindle 20. This pivotal movement of the carrier 39 accurately positions the cartridge 41 and the tool change arm 38 relative to the spindle 20. The tool change arm 38 is then actuated to extract the tool 21 from the cartridge 41 and interchange it with the tool 21 in the spindle 20.

Although a particular tool transfer mechanism is illustrated in connection with the tool storage magazine of the present invention, it should be understood that different types of tool change mechanisms may be employed and it is not necessary for the tool transfer mechanism to extract the cartridges 41 from the tool storage magazine. This tool transfer operation can be performed by extracting a tool from the cartridge 41 at the tool change station 60 without removing the cartridge 41 from the magazine. For this reason, the tool transfer mechanism comprising the tool change arm 38 and carrier 39 is not described in detail in the present application, but a complete description of these components is provided in co-pending patent application.

Figure 9:
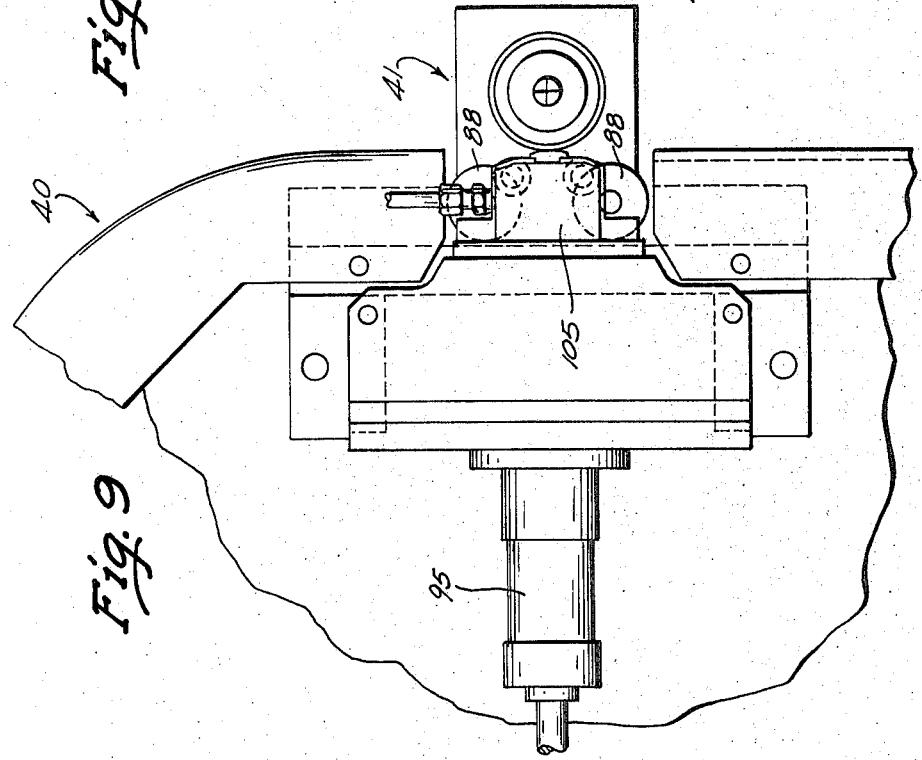
FIG. 9 is a fragmentary view substantially in side elevation illustrating a tool reader carried by the magazine at the tool change station for reading the coding on the tools to identify them.

Moreover, the desired tools 21 may be positioned at the tool change station 60 by manual control of the power drive for the chain 45, or it may be accomplished automatically, and a variety of automatic systems may be utilized for this purpose. In the illustrated embodiment, automatic selection of the tools is accomplished by means of a system described in U.S. Pat. No. 3,366,248. In this arrangement, the tools 21 are provided with code rings 102 which will be of different diameter and disposed on a collar 103 of the tool 21 in different combinations and in coded relationship to identify the particular tools. These code rings 102 are then moved past a tool reader 105 illustrated in FIG. 9 which is actuated by the code rings 102 for identifying the tools as they pass through the tool change station.

A particular machining program will specify the next desired tool in the numerical control circuit, and when the tool reader 105 identifies this selected tool, it automatically terminates the actuation of the tool storage chain 45. At this time, the chain clamping mechanism, illustrated in FIGS. 10 and 11, is actuated to move the prongs 96 into engagement with the chain 45 for accurately aligning the chain and the tool at the tool change station 60 and for securely locking the chain 45 in the aligned position. The tool interchange operation can then take place.

From the foregoing detailed description of the illustrative embodiment set forth herein to exemplify the present invention, it will be apparent that there has been provided an improved extremely versatile tool storage mechanism for storing tools that are to be employed at a work station of a machine tool. The tools are capable of being spaced different distances apart to accommodate a variety of situations although the spacing of the tools can be increased, the capacity of the magazine to store tools will be reduced to only that required to obtain the required spacing without wasting additional capacity. The tool storage magazine is adapted for operation with tool change mechanisms in which the entire socket is removed from the magazine during the tool change operation, as well as with tool change mechanisms in which the tool itself is removed from the socket in the magazine while the socket remains.

Althoug the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

What we claim:

1. In a tool storage magazine for storing a plurality of tools to be used at a work station of a machine tool;
  a plurality of toolholders in the magazine for holding the tools to be used at the work station, each of said toolholders being of substantially the same size and movable in the magazine;
  power drive means connected to move said toolholders in a predetermined path of travel in the magazine; and
  means slidably coupling every one of the toolholders in said magazine to cooperating coupling means on said power drive means, said coupling means coupling the toolholders to said power drive means at different spaced positions with respect to each other so that the spacing of adjacent toolholders can be varied in increments less than the minimum pitch between toolholders in order to accommodate the size of the tools being used while utilizing the capacity of the magazine with the greatest efficiency.

2. A tool storage magazine according to claim 1 wherein said coupling means is slidably engaged with said cooperating coupling means on said power drive means,
  whereby the insertion of each of said toolholders into the magazine will slide said coupling means into engagement for making a driving connection between said power drive means and said toolholders.

3. A tool storage magazine according to claim 2 wherein said power drive means is a continuous chain driven in a predetermined path of travel.

4. A tool storage magazine according to claim 3 wherein said tool storage magazine includes,
  a tool change station; and
  a lock actuatable to lock said chain in stopped position with a toolholder containing a selected tool at the tool change station.

5. A tool storage magazine according to claim 4 including,
  aligning means on said lock in position to engage said chain as said lock is actuated to move said chain into a predetermined alignment for accurately locating the selected tool at the tool change station.

6. A tool storage magazine according to claim 3 wherein said coupling means includes legs extending from each of said toolholders so that said legs slide into engagement with said chain when the toolholders are placed in the magazine to make the driving connection for moving said toolholders in the magazine.

7. A tool storage magazine according to claim 6 wherein said coupling means include pins extending outwardly from both sides of said chain for engagement by said legs to make the driving connection between said chain and said toolholders.

8. A tool storage magazine according to claim 2 including,
  a retainer mounted in said magazine for retaining said toolholders in engagement with said power drive means, a portion of said retainer being removable to enable the toolholders to be placed in the magazine and to be removed therefrom.

9. A tool storage magazine according to claim 6 provided with a tool change station;
  a retainer mounted in said magazine for retaining said legs in engagement with said chain for retaining the driving connection between said toolholders and said chain, said retainer being interrupted at the tool change station to enable the toolholder to be placed in the magazine and to be removed from the magazine; and
a removable retainer at the tool change station to enable said toolholders to pass through the tool change station during a tool selection operation, said retainer being removable to enable toolholders to be placed in the magazine and to be removed from the magazine at the tool change station.

10. A tool storage magazine according to claim 1 wherein said power drive means is a continuous chain driven in an established path of travel in the magazine; and
said coupling means includes extending legs on each of said toolholders that slide into engagement with said chain when the toolholder is placed in the magazine so that the toolholders will be moved by said chain in the established path of travel.

11. A tool storage magazine according to claim 10 including,
a tool change station in the magazine; and
a retainer supported in said magazine in position to retain said toolholders in driving engagement with said power means, said retainer being interrupted at the tool change station so that the toolholders can be removed from the magazine and placed in the magazine at the tool change station.

12. A tool storage magazine according to claim 11 including,
a removable retainer at the tool change station serving to retain the toolholders at the tool change station in engagement with said power drive means so that said toolholders can pass through the tool change station, said retainer being removable so that the toolholders can be removed from the magazine and placed into the magazine at the tool change station.

13. A tool storage magazine according to claim 10 wherein said coupling means include pins extending outwardly from both sides of said chain, and said extending legs on said toolholders engage said pins for making the driving connection between said chain and said toolholders.

14. A tool storage magazine according to claim 10 including,
a tool change station in the magazine; and
a retainer supported in said magazine in position to retain said extending legs in engagement with said chain to retain the driving connection between said toolholders and said chain, said retainer being interrupted at the tool change station so that the toolholders can be removed from the magazine and placed in the magazine at the tool change station.

* * * * *